United States Patent
Nobata

(12) 
(10) Patent No.: US 12,109,738 B2
(45) Date of Patent: Oct. 8, 2024

(54) SEPARATOR MACHINING APPARATUS AND SEPARATOR MACHINING METHOD

(71) Applicant: TOYOTA JIDOSHA KABUSHIKI KAISHA, Toyota (JP)

(72) Inventor: Yasuhiro Nobata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/656,609

(22) Filed: Mar. 25, 2022

(65) Prior Publication Data
US 2022/0305701 A1    Sep. 29, 2022

(30) Foreign Application Priority Data
Mar. 24, 2021    (JP) ................. 2021-050477

(51) Int. Cl.
B29C 43/02    (2006.01)
B29C 43/52    (2006.01)
B29L 31/34    (2006.01)
H01M 8/0243    (2016.01)

(52) U.S. Cl.
CPC ........... B29C 43/021 (2013.01); B29C 43/52 (2013.01); *B29C 2043/023* (2013.01); *B29K 2995/0005* (2013.01); *B29L 2031/3468* (2013.01); *H01M 8/0243* (2013.01)

(58) Field of Classification Search
CPC .. B29C 2043/365229; B29C 2043/302; B29C 2043/3602; B29C 51/262; B29C 2045/14163
See application file for complete search history.

(56) References Cited

U.S. PATENT DOCUMENTS

2004/0115505 A1    6/2004    Oyama
2017/0129141 A1*   5/2017    Masaka ................. B29C 33/14

FOREIGN PATENT DOCUMENTS

EP    1752274 A1 *    2/2007    ............. A47C 31/02
JP    2004188722 A    7/2004
JP    2007122899 A    5/2007

OTHER PUBLICATIONS

Takigawa (English Translation of JPH08300379) (Year: 1995).*
English Translation of Ogami, JP 2006331861 (Year: 2006).*
English Translation of Sugimoto, JP 2011194739 (Year: 2011).*

* cited by examiner

*Primary Examiner* — Michael A Tolin
*Assistant Examiner* — Hana C Page
(74) *Attorney, Agent, or Firm* — Hunton Andrews Kurth LLP

(57) ABSTRACT

A machining apparatus includes an apparatus body and a setting jig. The setting jig has a frame body including openings to expose molding regions, which are to be molded by the apparatus body, of the sheet material, and a restraining portion to restrain a periphery of the molding regions. The apparatus body includes a support member that supports the setting jig at a position where the molding regions are disposed between an upper die and a lower die, and a first urging member to urge the support member toward the upper die so as to separate the molded body from the lower die, with the upper die disengaged from the lower die.

5 Claims, 8 Drawing Sheets

SEPARATOR MACHINING APPARATUS AND SEPARATOR MACHINING METHOD

CROSS REFERENCE TO RELATED APPLICATIONS

The present application claims priority from Japanese patent application JP 2021-050477 filed on Mar. 24, 2021, the entire content of which is hereby incorporated by reference into this application.

BACKGROUND

Technical Field

The present disclosure relates to a machining apparatus and method for forming a shape of a separator for a fuel cell by hot-press-molding.

Background Art

As a conventional technique of this kind, JP 2007-122899 A, for example, has proposed a machining apparatus for press-forming a separator for a fuel cell. Such a machining apparatus includes a pair of forming dies for hot-press-molding of a sheet material containing a conductive material and a resin material.

SUMMARY

However, when the machining apparatus described in JP 2007-122899 A is used for hot-press-molding of a sheet material, a hot-press-molded resin sheet is occasionally difficult to be removed from the forming die, which excessively heats a molded body (separator) obtained from molding the sheet material and the quality of the obtained separator is thus expected to be deteriorated. Such a phenomenon is noticeable particularly in a case where a pair of forming dies are used for hot-press-molding of a sheet material to form a shape in which a plurality of separators is arranged on a plane Considering these matters, the present disclosure provides a separator machining apparatus and method that can prevent a molded body from being excessively heated when a sheet material is hot-press-molded to form the molded body in a shape in which a plurality of separators is arranged on a plane.

In view of the foregoing, the present disclosure provides a separator machining apparatus for hot-press-molding of a sheet material containing a conductive material and a resin material to form a shape of a separator for a fuel cell, the separator machining apparatus including: an apparatus body adapted to perform hot-press-molding of the sheet material to form a molded body in a shape in which a plurality of separators is arranged on a plane; and a setting jig adapted to set the sheet material on the apparatus body, in which the apparatus body includes: an upper die and a lower die adapted to sandwich the sheet material therebetween to perform hot-press-molding to form the molded body; a support member adapted to support the setting jig at a position where a molding region is disposed between the upper die and the lower die; and a first urging member adapted to urge the support member toward the upper die so as to separate the molded body from the lower die, with the upper die disengaged from the lower die, and the setting jig is in a frame shape having an opening for exposing the molding region of the sheet material to be molded by the apparatus body and a restraining portion for restraining a periphery of the molding region.

According to the present disclosure, the setting jig, on which a sheet material is mounted with its molding region exposed and its periphery restrained, can be supported by the support member of the machining apparatus at a position where the molding region is disposed between the upper die and the lower die. When the molding region of the sheet material is hot-press-molded while being sandwiched between the upper die and the lower, with such a supporting state, a molded body having a shape in which a plurality of separators is arranged on a plane is obtained.

Herein, while the upper die is being disengaged from the lower die after the hot-press-molding, the first urging member urges the setting jig toward the upper die so as to separate the molded body from the lower die, so that the setting jig is lifted relative to the lower die. It should be note that after molding, upon disengaging the upper die from the lower die, the setting jig restraining the sheet material is disengaged from the upper die under its own weight. Thus, the molded body is quickly separated from the lower die, so that excessive heating of the molded body due to the heat from the lower die can be suppressed. As a result, the deterioration of the resin contained in the molded body can be suppressed, and thus, the obtained plurality of separators that is die-cut from the molded body has a more uniform quality.

In some embodiments, the apparatus body further includes a second urging member adapted to urge the setting jig toward the lower die so as to separate the molded body from the upper die until the upper die and the lower die sandwiching the sheet material are disengaged from each other.

With such a configuration, after hot-press-molding, the molded body is separated from the lower die by the first urging member while the upper die is being lifted, and is also urged by the second urging member so that the molded body can be quickly separated from the upper die. In this manner, the effect of the heat transferred from the upper die and the lower die on the molded body is suppressed, so that the temperature of the molded body can be appropriately controlled.

Further, a separator machining method of the present disclosure shown below will be described. The separator machining method according to the present disclosure uses the aforementioned separator machining apparatus and includes at least: mounting the sheet material on the setting jig so as to restrain the periphery of the molding region of the sheet material; disposing the setting jig on the support member; performing hot-press-molding of the sheet material to form the molded body such that the upper die is lowered toward the lower die to sandwich the molding region between the upper die and the lower die; and disengaging the upper die from the lower die.

According to the separator machining method configured as such, in disengaging the upper die from the lower die, the first urging member urges the setting jig toward the upper die so as to separate the molded body from the lower die. This allows instantaneous separation of the molded body from the lower die, thus enabling to suppress the excessive heating of the molded body due to the heat from the lower die.

The present disclosure can suppress excessive heating of a molded body when a sheet material is hot-press-molded to form the molded body in a shape in which a plurality of separators is arranged on a plane.

DETAILED DESCRIPTION

The following will describe in detail an embodiment of a machining apparatus for a separator for a fuel cell according to the present embodiment with reference to the drawings. An example of the configuration of a fuel cell with a separator for a fuel cell and a stack of the fuel cells will be described first, and the description of embodiments of a machining apparatus and a machining method for a separator for a fuel cell according to the present disclosure will follow.

1. Fuel Cell (Cell 51) and Separator 53

Figure 1:
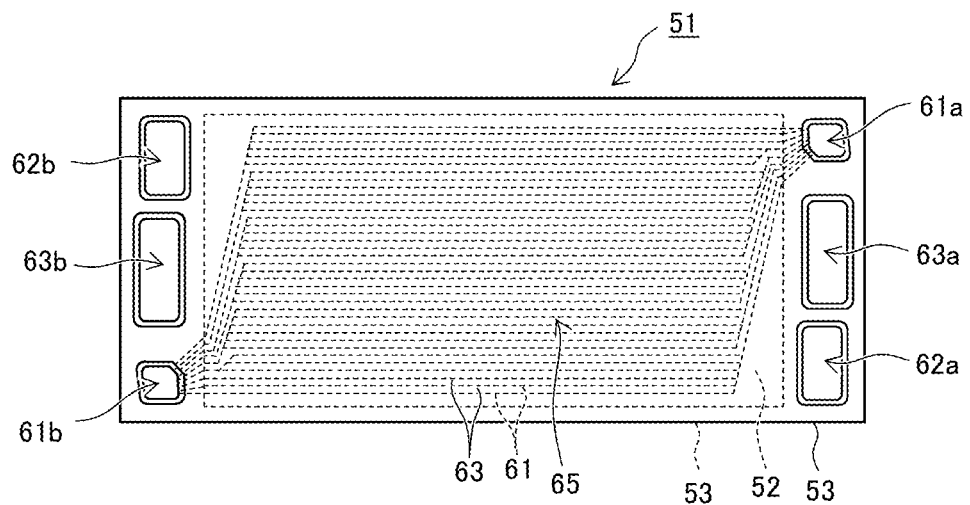
FIG. 1 is a plan view of a fuel cell for which a separator for a fuel cell is used.
Figure 2:
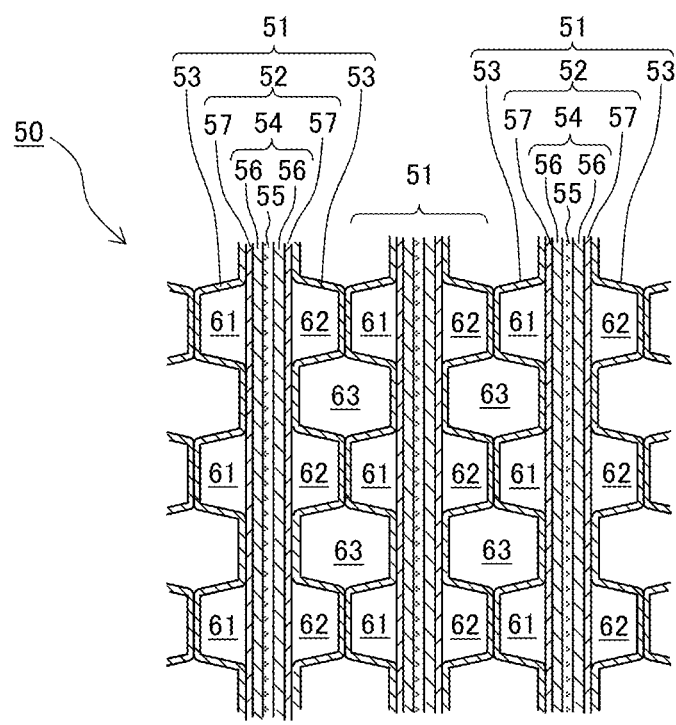
FIG. 2 is an enlarged cross-sectional view of a main part of a fuel cell stack including the fuel cells shown in FIG. 1 stacked.

FIG. 1 is a plan view of a fuel cell (hereinafter, abbreviated as "cell 51"). FIG. 2 is an enlarged cross-sectional view of a main part of a fuel cell stack (hereinafter, abbreviated as "stack 50") including the cells 51 shown in FIG. 1 stacked. The cell 51 is, for example, a polymer electrolyte fuel cell that generates an electromotive force due to the electrochemical reaction between an oxidant gas such as air and a fuel gas such as hydrogen. The cell 51 includes a membrane-electrode-gas diffusion layer assembly (hereinafter, abbreviated as "MEGA 52") and separators 53 contacting the MEGA 52 to section the MEGA 52.

The MEGA 52 is a power generation portion of the cell 51 that generates an electromotive force due to the electrochemical reaction. The MEGA 52 is sandwiched between a pair of separators 53, 53. The MEGA 52 includes a membrane-electrode assembly (hereinafter, abbreviated as "MEA 54") and gas diffusion layers 57, 57 disposed on the opposite sides of the MEA 54, the MEA 54 and the gas diffusion layers 57, 57 being integrally formed.

The MEA 54 includes an electrolyte membrane 55 and a pair of electrodes 56, 56 that are assembled so as to sandwich the electrolyte membrane 55. The electrolyte membrane 55 is a proton-conducting ion-exchange membrane formed of a solid polymer electrolyte material. It should be noted that in the cell 51 without the gas diffusion layers 57, 57, the MEA 54 is the power generation portion of the cell 51.

The electrodes 56 include, for example, a porous carbon material that supports a catalyst, such as platinum. One electrode 56 disposed on one side of the electrolyte membrane 55 is an anode and the electrode 56 on the other side is a cathode. The adjacent two cells 51 of the stack 50 are disposed with the electrode 56 as an anode and the electrode 56 as a cathode facing each other.

The gas diffusion layers 57 include, for example, a carbon porous body such as a carbon paper or carbon cloth, or a gas permeable and conductive member such as a metal porous body, e.g., a metal mesh or a foam metal.

The separator 53 is a conductive plate-like resin member and is produced using a machining apparatus 1 (see FIG. 3) for the separator 53 for a fuel cell which will be described later. The separator 53 is a molded body containing a conductive material and a resin material, and may additionally contain an additive. The material of the separator 53 will be described later in the description of a sheet material 2 before being machined into the separator 53.

The pair of separators 53 that form the cell 51 include a flow channel portion 65 as shown in FIG. 1. The flow channel portion 65 has, for example, a transverse cross section in a wave shape or a shape with recesses and projections as shown in FIG. 2, and forms a plurality of streaky flow channels 61 and 63 extending across the power generation portion in the longitudinal direction of the cell 51 shown in FIG. 1. It should be noted that FIG. 1 shows the cell 51 as viewed from the side of one separator (an anode side separator) 53 having the flow channels 61 and 63, but as is also appreciable from FIG. 2, the other separator (a cathode side separator) 53 also has the flow channels 62 and 63.

Of the pair of separators 53, 53 of each cell 51, the anode side separator 53, together with the MEGA 52, defines the flow channel 61 for a fuel gas, and the cathode side separator 53, together with the MEGA 52, defines the flow channel 62 for an oxidant gas. Further, the outer side surface of the anode side separator 53 of one of the adjacent two cells 51 contacts the outer side surface of the cathode side separator 53 of the other of the adjacent two cells 51. In this manner, the flow channel 63 for a refrigerant is defined between the adjacent two cells 51.

More specifically, each separator 53 has an isosceles trapezoid wave shape with the top portion of the wave shape substantially flat, the opposite ends of the top portion being angular with equal angles. That is, the shape of the separator 53 is substantially the same as viewed from both its inner side facing the MEGA 52 and its outer side opposite to the MEGA 52. The top portion of the wave shape of the anode side separator 53 of the pair of separators 53, 53 of each cell 51 is in surface-contact with the gas diffusion layer 57 on the anode side of the MEGA 52 and the top portion of the wave shape of the cathode side separator 53 is in surface-contact with the gas diffusion layer 57 on the cathode side of the MEGA 52.

Each separator 53 has manifold holes 61a, 61b communicating with the flow channel 61, manifold holes 62a, 62b communicating with the flow channel 62, and manifold holes 63a, 63b communicating with the flow channel 63.

With such a configuration, in each cell 51, when the flow channel 61 on the anode side of the MEGA 52 is provided with a fuel gas, and the flow channel 62 on the cathode side of the MEGA 52 is provided with an oxidant gas, an electrochemical reaction takes place in the MEGA 52 to generate an electromotive force. The stack 50 externally provides the electromotive force generated in the plurality of cells 51 at the opposite ends of the stacked plurality of cells 51. Each cell 51 of the stack 50 generates heat through power generation, but is cooled by a refrigerant such as cooling water flowing through the flow channel 63 between the adjacent cells 51, 51.

2. Machining Apparatus 1 for Separator 53

Figure 3:
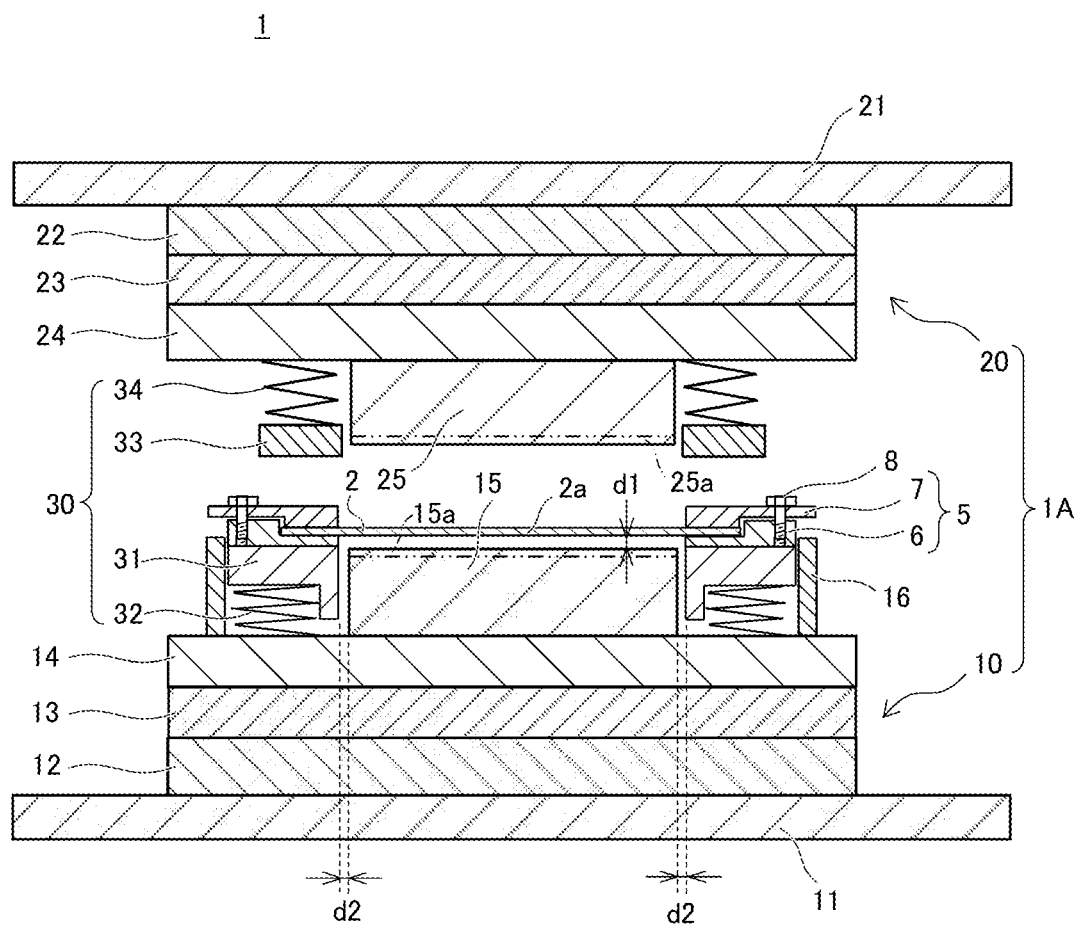
FIG. 3 is a cross-sectional view of a machining apparatus for a separator for a fuel cell according to the present embodiment, with an upper die lifted from a lower die.
Figure 4:
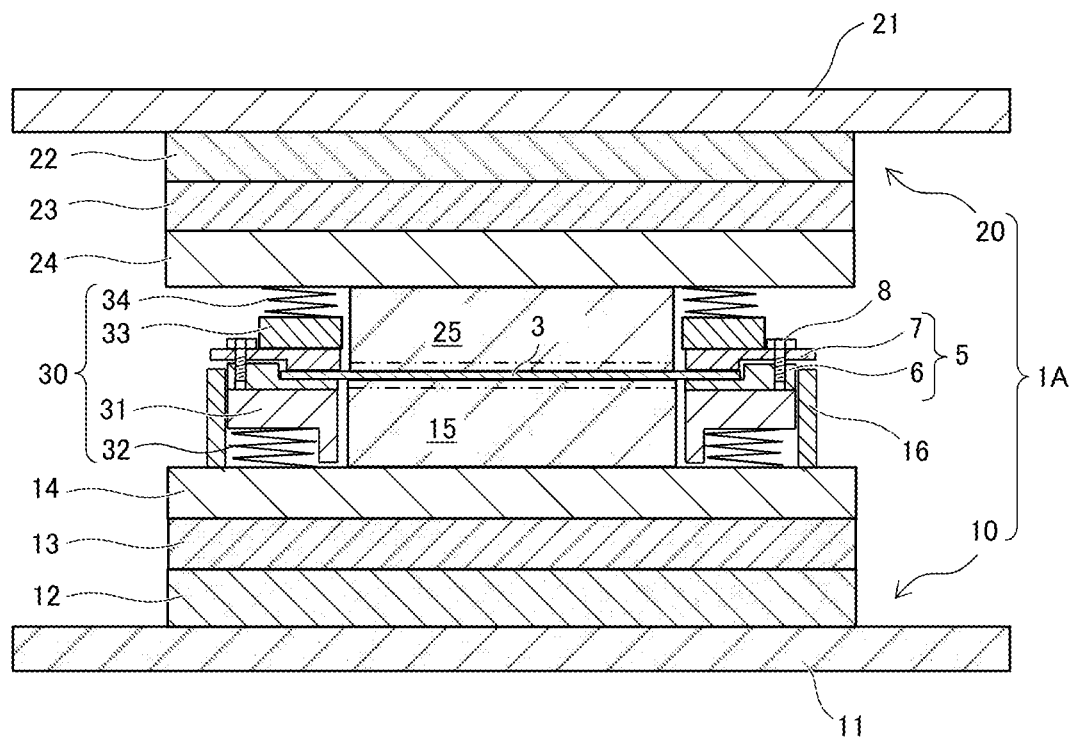
FIG. 4 is a cross-sectional view of the machining apparatus shown in FIG. 3, with the upper die lowered at the time of hot-press-molding.
Figure 5:
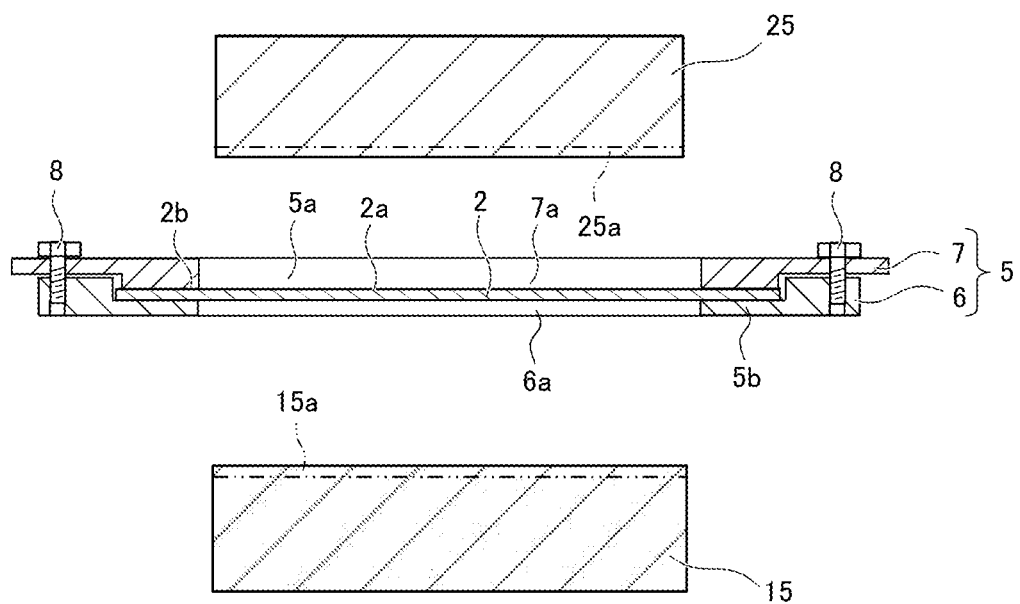
FIG. 5 is a cross-sectional view of the upper die, the lower die, and a setting jig as a main part, showing their arrangement and dimensions.

Next, a machining apparatus for forming the separator 53 by hot-press-molding will be described in detail. FIG. 3 is a cross-sectional view of a machining apparatus for a separator for a fuel cell 1 of the present embodiment, with an upper die 25 lifted, FIG. 4 is a cross-sectional view showing the upper die 25 lowered at the time of hot-press-molding, and FIG. 5 is a cross-sectional view of the upper die 25, a lower die 15, a support member 31, and a setting jig 5 as a main part, showing their relations. It should be noted that for clear illustration of a part of the configuration, FIG. 3 and FIG. 4 show the end faces.

As shown in FIG. 3 and FIG. 4, the machining apparatus 1 for a separator for a fuel cell according to the present embodiment preforms hot-press-molding of the sheet material 2, which is to be molded, to form a molded body 3 in a shape in which a plurality of separators is arranged on a plane. The machining apparatus 1 lowers the upper die 25 positioned on the upper side toward the lower die 15 positioned on the lower side so as to sandwich the sheet material 2 between the lower die 15 and the upper die 25 to be pressed, so that the molded body 3 is press-formed while being heated.

2-1. Sheet Material 2

The sheet material 2 is a conductive sheet-like member containing a conductive material and a resin material. The conductive material in the form of conductive particles, conductive wire, or the like is contained in the sheet material 2. The examples of the conductive material include metal such as iron and aluminum, and nonmetal such as carbon and conductive ceramic. In the present embodiment, the sheet material 2 contains carbon particles. The carbon particles may be either artificial or natural graphite powder. The conductive material is contained by 70 to 80 percent by volume relative to the entire sheet material 2.

The resin contained in the sheet material 2 is either a thermosetting resin or a thermoplastic resin and bonds the conductive materials. The examples of the thermosetting resin that may be used include an epoxy resin, a phenolic resin, a silicon resin, and a fluorine resin. The examples of the thermoplastic resin may include polystyrene, polypropylene, polyamide, and ABS, and may be crystalline plastics such as polyacetal, polyethylene, and polyetheretherketone. It should be noted that when the sheet material 2 is formed of a thermosetting resin, the shape retainability of the sheet material 2 can be secured, and the thermosetting resin may be cured (half-cured) by completing the thermosetting processing with the heat at the time of hot-press-molding so as to maintain the shape of the separator 53.

The machining apparatus 1 is used for performing hot-press-molding of one sheet material 2 containing a conductive material and a resin material to form the molded body 3 including two separators 53, 53, which will be described later in detail. However, the number of the separators 53 is not limited to two, but may be any number more than two.

2-2. Apparatus Body 1A

In the present embodiment, the machining apparatus 1 includes an apparatus body 1A for performing hot-press-molding of the sheet material 2 to form the molded body 3 in a shape in which two separators 53, 53 are arranged on a plane, and the setting jig 5 to set up the sheet material on the apparatus body 1A. The apparatus body 1A includes the lower die 15 and the upper die 25 that sandwich the sheet material 2 therebetween to perform hot-press-molding to form the molded body 3.

The lower die 15 is a part of a lower die unit 10, which will be described later, and the upper die 25 is a part of an upper die unit 20, which will be described later, the lower die unit 10 and the upper die unit 20 constituting a molding device. The apparatus body 1A may additionally include a conveying device 40 for conveying the setting jig 5 on which the sheet material 2 or the molded body 3 is mounted, a die-cut device 70 for die-cutting the separator 53 from the molded body 3 mounted on the setting jig 5, and the like.

The lower die unit 10 includes a lower set plate 11, a heat insulating plate 12, a temperature adjusting board 13, a subset plate 14, and a lower die 15, which are disposed from the bottom in this order.

The lower set plate 11 is securely disposed on a base that is not shown. The heat insulating plate 12 insulates the heat transferring from the temperature adjusting board 13 disposed thereon toward the lower set plate 11, and may be formed of a heat insulating board of the like. The temperature adjusting board 13, including a built-in electric heater or the like, has a function of adjusting the temperature to a predetermined temperature by a thermostat or the like. The subset plate 14 is a member to set the temperature adjusting board 13 by sandwiching it, together with the lower set plate 11, and also functions to position the lower die 15. The heat insulating plate 12, the temperature adjusting board 13, and the subset plate 14 are integrally secured to the lower set plate 11 with bolts or the like.

The lower die 15 is secured to the upper portion of the subset plate 14 with bolts or the like. On the surface of the lower die 15, a molding pattern 15a is formed, the molding pattern 15a corresponding in shape to the surface on one side of the molded body 3, which will be described later (see FIG. 3). The lower die 15 is a nested mold, and a portion including the molding pattern 15a of the lower die 15 is to be inserted into the frame-shaped setting jig 5, which will be described later, from the lower side. The molding pattern 15a is shaped to form a gas flow channel or the like that is required for the separator 53 for a fuel cell.

The upper die unit 20 is disposed above the lower die unit 10 and includes an upper set plate 21, a heat insulating plate 22, a temperature adjusting board 23, a subset plate 24, and an upper die 25, which are disposed from the top in this order. The heat insulating plate 22, the temperature adjusting board 23, and the subset plate 24 are integrally secured to the upper set plate 21 with bolts or the like.

The upper set plate 21 is supported by a housing (not shown) of the machining apparatus 1 so as to be slidable downward by a slide press mechanism (not shown). The heat insulating plate 22 and the temperature adjusting board 23 have the same configurations as those of the heat insulating plate 12 and the temperature adjusting board 13 of the lower die unit 10.

The upper die 25 is secured to the lower portion of the subset plate 24 with bolts or the like. On the surface of the upper die 25, a molding pattern 25a is formed, the molding pattern 25a corresponding in shape to the surface on the other side of the molded body 3, which will be described later (see FIG. 3). The upper die 25 is a nested mold, and a portion including the molding pattern 25a of the upper die 25 is to be inserted into the frame-shaped setting jig 5, which will be described later, from the upper side. The molding pattern 25a is shaped to form a gas flow channel or the like that is required for the separator 53 for a fuel cell.

In this manner, the lower die 15 is heated by the temperature adjusting board 13 and the upper die 25 is heated by the temperature adjusting board 23, and while both sides of the sheet material 2 are heated with the heat generated as such, molding regions 2a of the sheet material 2 sandwiched between the lower die 15 and the upper die 25 are deformed. Thus, the sheet material 2 can be hot-press-molded to form the molded body 3. The heat insulating plate 12 inhibits the heat generated in the temperature adjusting board 13 from transferring to the lower set plate 11, and the heat insulating plate 22 inhibits the heat generated in the temperature adjusting board 23 from transferring to the upper set plate 21.

2-3. Setting Jig 5

As shown in FIG. 5, the setting jig 5 has a frame body including an opening 5a to expose the molding region 2a, which is to be molded by the apparatus body 1A, of the sheet material 2, and a restraining portion 5b to restrain a periphery 2b of the molding region 2a. The molding region 2a is dimensioned smaller than the opening 5a that is sized and dimensioned to allow a part of each of the lower die 15 and the upper die 25 to be inserted thereinto at the time of hot-press-molding.

Figure 6:
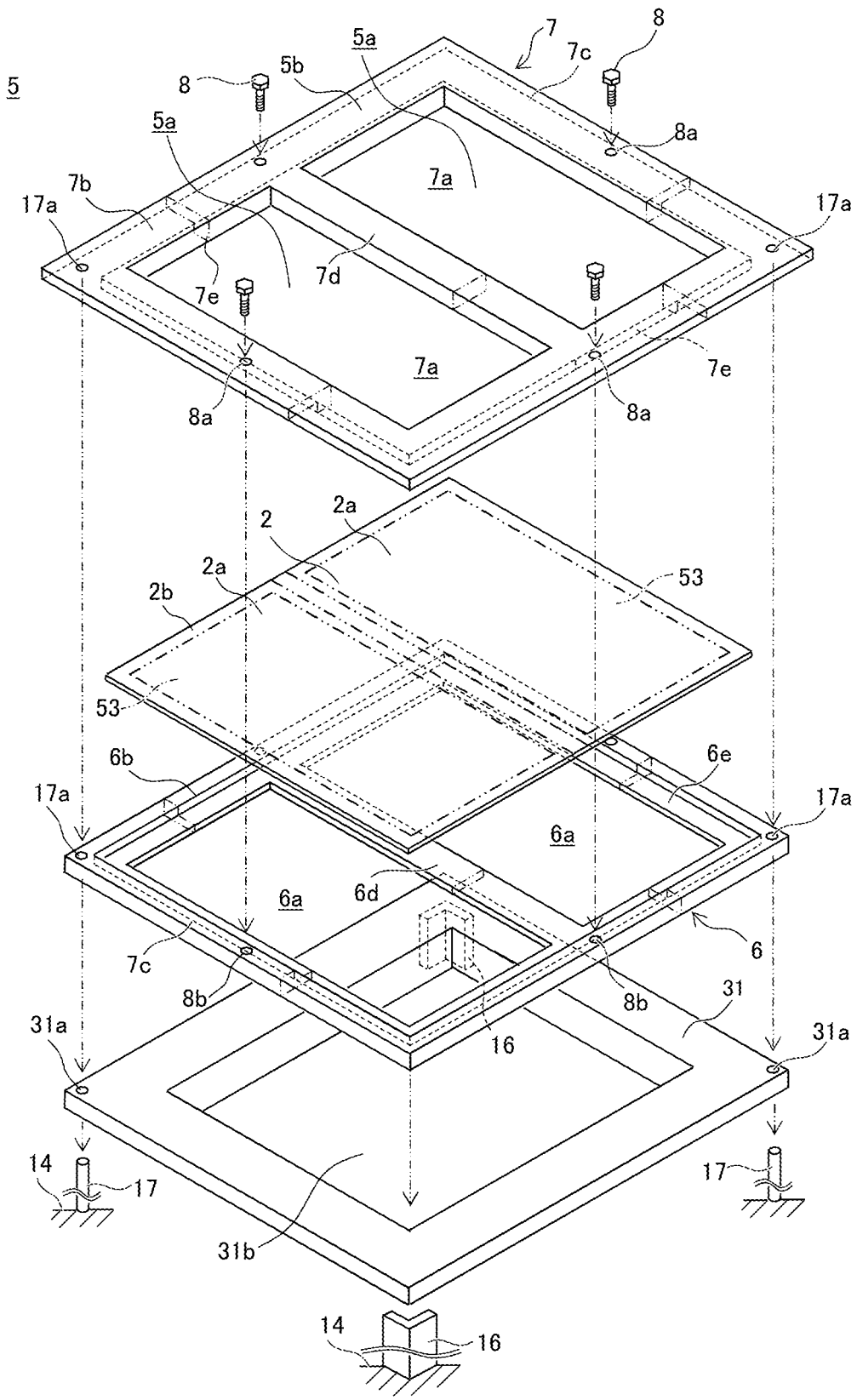
FIG. 6 is an exploded perspective view of the setting jig retaining a sheet material in the machining apparatus shown in FIG. 3 and FIG. 4.
Figure 7:
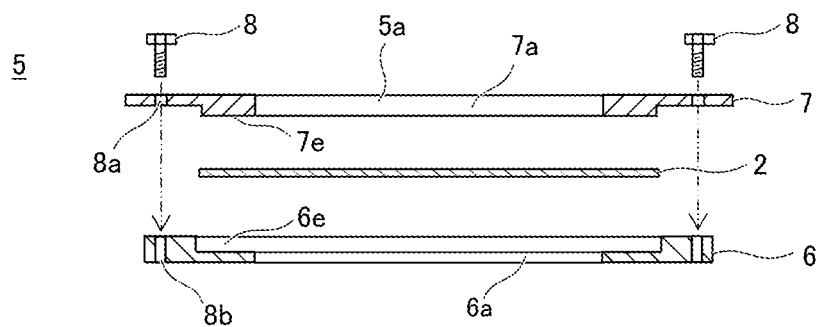
FIG. 7 is a cross-sectional view of the setting jig shown in FIG. 6, before retaining the sheet material.

As shown in FIG. 6 and FIG. 7, the setting jig 5 includes a lower frame body 6 and an upper frame body 7, which are integrally coupled with a plurality of bolts (fixtures) 8. Screw holes 8b and through holes 8a are formed on the lower frame body 6 and the upper frame body 7, respectively, and the bolts 8 are screwed through the through holes 8a into the screw holes 8b. The lower frame body 6 and the upper frame body 7 of the setting jig 5 each have a rectangular outer shape. Two openings 6a, 6a corresponding in size to the separators 53, 53 (specifically, molding regions 2a, 2a) are formed in a midsection of the lower frame body 6. Two openings 7a, 7a corresponding in size to the separators 53, 53 (specifically, molding regions 2a, 2a) are also formed in a midsection of the upper frame body 7. The lower frame body 6 and the upper frame body 7 are integrally formed with the openings 6a and the openings 7a overlapping with each other so that the openings 5a are formed in the setting jig 5.

In the present embodiment, when the lower frame body 6 and the upper frame body 7 are integrally formed, with a periphery 6b to form the openings 6a of the lower frame body 6 overlapping with a periphery 7b to form the openings 7a of the upper frame body 7, the restraining portion 5b to restrain the periphery 2b of the molding regions 2a of the sheet material 2 is formed. In the present embodiment, the periphery 6b (7b) is provided with an outer frame portion 6c (7c) entirely surrounding the two openings 6a, 6a (7a, 7a), and a partitioning portion 6d (7d) to partition the two molding regions 2a.

In this manner, the partitioning portions 6d and 7d also form the restraining portion 5b to restrain the periphery 2b, thus more surely restraining each of the two molding regions 2a of the sheet material 2 by the restraining portion 5b. It should be noted that though not shown, the lower die 15 and the upper die 25 have grooves to avoid these partitioning portions 6d and 7d at the time of hot-press-molding. As long as the molding regions 2a can be restrained, these partitioning portions 6d and 7d may be omitted.

Herein, in the present embodiment, as shown in FIG. 6 and FIG. 7, the outer frame portion 6c of the lower frame body 6 has a recessed groove 6e into which the periphery of the sheet material 2 is to fit, and the outer frame portion 7c of the upper frame body 7 has a protrusion 7e to engage the recessed groove 6e. The periphery 2b of the molding regions 2a of the sheet material 2 can be restrained by the recessed groove 6e and the protrusion 7e engaging with each other via the periphery of the sheet material 2.

It should be noted that as shown in FIG. 6 and FIG. 7, in the present embodiment, the lower frame body 6 is provided with the recessed groove 6e, and the upper frame body 7 is provided with the protrusion 7e, but the recessed groove and the protrusion may be provided vice versa.

2-4. Disengaging Mechanism 30 for Setting Jig 5 and Positioning

In the present embodiment, as shown in FIG. 4, the apparatus body 1A further includes a disengaging mechanism 30 for disengaging the setting jig 5 from the lower die unit 10 and the upper die unit 20. In the present embodiment, the lower die unit 10 of the apparatus body 1A includes the support member 31 and a first urging member 32, and the upper die unit 20 includes a pressing-down member 33 and a second urging member 34.

The support member 31 supports the setting jig 5 at a position where the molding regions 2a are disposed between the upper die 25 and the lower die 15. In the present embodiment, the support member 31 abuts the lower frame body 6 of the setting jig 5. The first urging member 32 urges the support member 31 toward the upper die 25 so as to separate the molded body 3 from the lower die 15, with the upper die 25 disengaged from the lower die 15.

In the present embodiment, as shown in FIG. 6, the support member 31 is a frame member having an opening 31b into which the lower die 15 is inserted, and abuts the lower frame body 6. However, as long as the support member 31 abuts the lower frame body 6 and can support the setting jig 5, the support member 31 may be formed of a plurality of members. The first urging member 32 is coupled to the subset plate 14 and the support member 31, and a plurality of those is disposed along the underside of the support member 31. The first urging member 32 is not particularly limited, but may include, for example, an elastic spring or elastic rubber, as long as it can urge the support member 31 toward the upper die 25.

In the present embodiment, as shown in FIG. 3, the first urging member 32 supports the support member 31 so as to form a clearance d1 between the lower die 15 and the sheet material 2 (molding regions 2a), with the setting jig 5 supported by the support member 31.

In the present embodiment, the apparatus body 1A of the machining apparatus 1 includes two corner guides 16 and 16 between the upper die 25 and the lower die 15. In the present embodiment, the two corner guides 16, 16 are members to vertically guide diagonally-positioned two corners of four of those of the support member 31 in a rectangular frame body. In the present embodiment, the corner guides 16 are arranged vertically on the subset plate 14.

As shown in FIG. 3, at the time of hot-press-molding, since the support member 31 is moved downward by the upper die unit 20, the setting jig 5 is stably vertically movable by means of the corner guides 16. Further, in the present embodiment, since the two corner guides 16, 16 vertically guide the diagonally-positioned two corners of four of those of the support member 31 in a rectangular frame body, a clearance d2 between the lower die 15 and the frame-shaped support member 31 can be stably secured, as shown in FIG. 3. Note that in the present embodiment, as long as the corner guide 16 can guide the vertical movement of the support member 31 and secure the clearance d2 between the lower die 15 and the support member 31, the number of the corner guides 16 is not limited.

Further, the pressing-down member 33 presses down the setting jig 5 with its upper frame body 7 abutting the pressing-down member 33, at the time of hot-press-molding. The second urging member 34 urges the setting jig 5 toward the lower die 15 so as to separate the molded body 3 from the upper die 25 until the lower die 15 and the upper die 25 sandwiching the sheet material 2 therebetween (that is, the state shown in FIG. 4 in which the molded body 3 is formed) are disengaged from each other, which is the state shown in FIG. 3.

In this manner, after hot-press-molding, the molded body 3, which is in the state shown in FIG. 4, can be separated from the lower die 15 by means of the first urging member 32, while the upper die 25 is being lifted, and can also be quickly separated from the upper die 25 by means of the second urging member 34. Thus, the effect of the heat transferred from the upper die 25 and the lower die 15 on the molded body 3 can be suppressed, so that the temperature of the molded body 3 can be appropriately controlled. It should be noted that when the upper die 25 is lifted after molding, the setting jig 5 descends under its own weight, and thus, the second urging member 34 is not necessarily required.

Further, the apparatus body 1A of the machining apparatus 1 has two guide shafts 17, 17 so as to dispose the molding regions 2a of the sheet material 2 between the upper die 25 and the lower die 15. The guide shafts 17, 17 are members for positioning the setting jig 5 and are arranged vertically on the subset plate 14. However, the guide shafts 17, 17 may be arranged vertically on the support member 31, as long as the two guide shafts 17, 17 can position the setting jig 5. In the present embodiment, the two guide shafts 17, 17 are provided at the diagonally-positioned two corners of the support member 31 having a rectangular outer shape, which are different from the diagonally-positioned two corners at which the two corner guides 16, 16 are provided. However, the two guide shafts 17, 17 and the two corner guides 16, 16 may be provided at the same diagonally-positioned two corners.

In the present embodiment, the support member 31 has through holes 31a through which the guide shafts 17 are inserted, at diagonally-positioned corners of four corners. The guide shafts 17 inserted through the through holes 31a project from the upper surface of the support member 31. The portions of the guide shafts 17 projecting from the upper surface of the support member 31 are inserted through the through holes 17a formed in the setting jig 5, so that the setting jig 5 can be positioned relative to the apparatus body 1A. It should be noted that the guide shafts 17 are inserted through the through holes 17a and 31a such that the support member 31 and the setting jig 5 are vertically slidable relative to the guide shafts 17.

Figure 8:
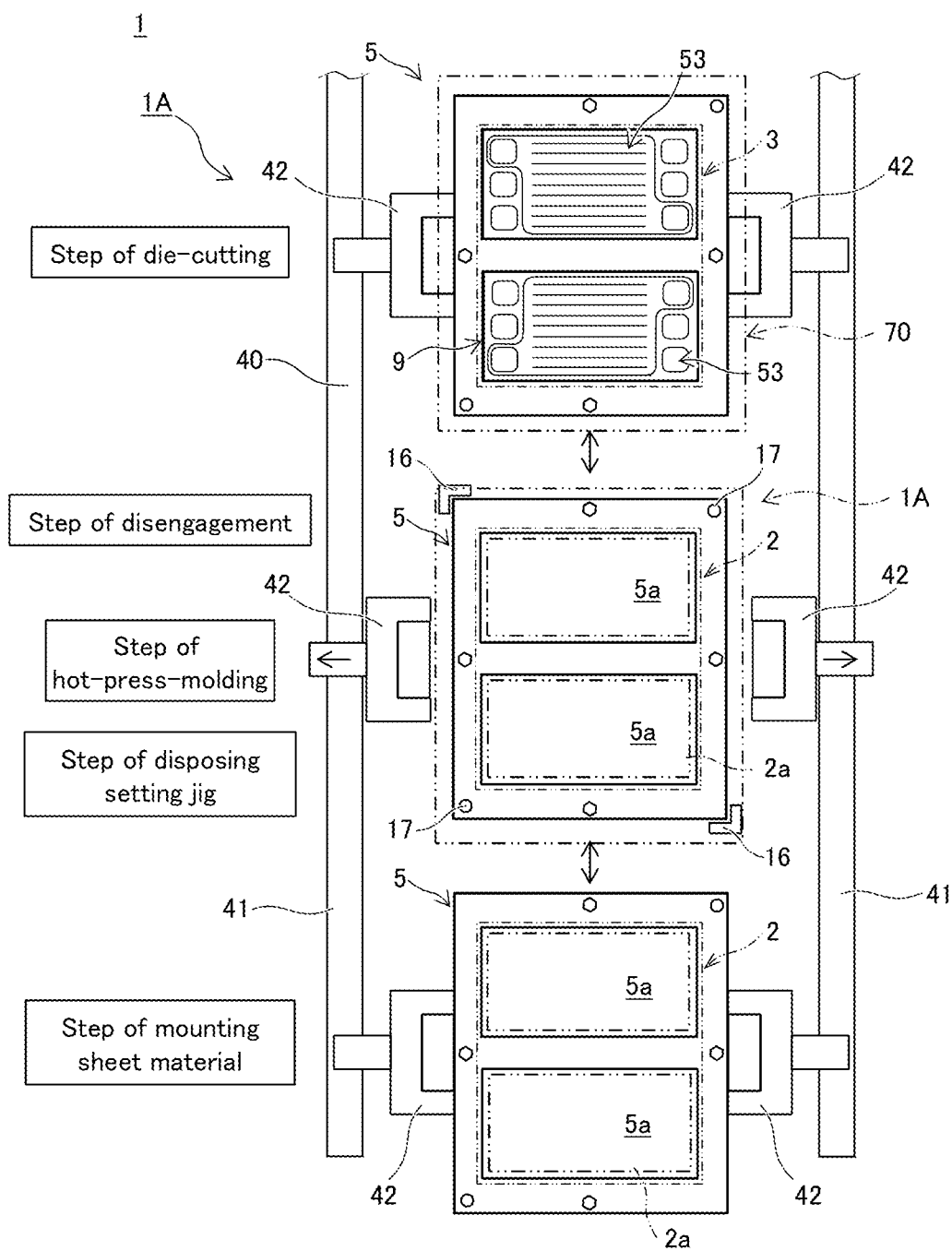
FIG. 8 is a plan view showing the operation of a conveying device that conveys the setting jig on which a sheet material is set, along with the steps of a separator machining method using the machining apparatus.
Figure 9:
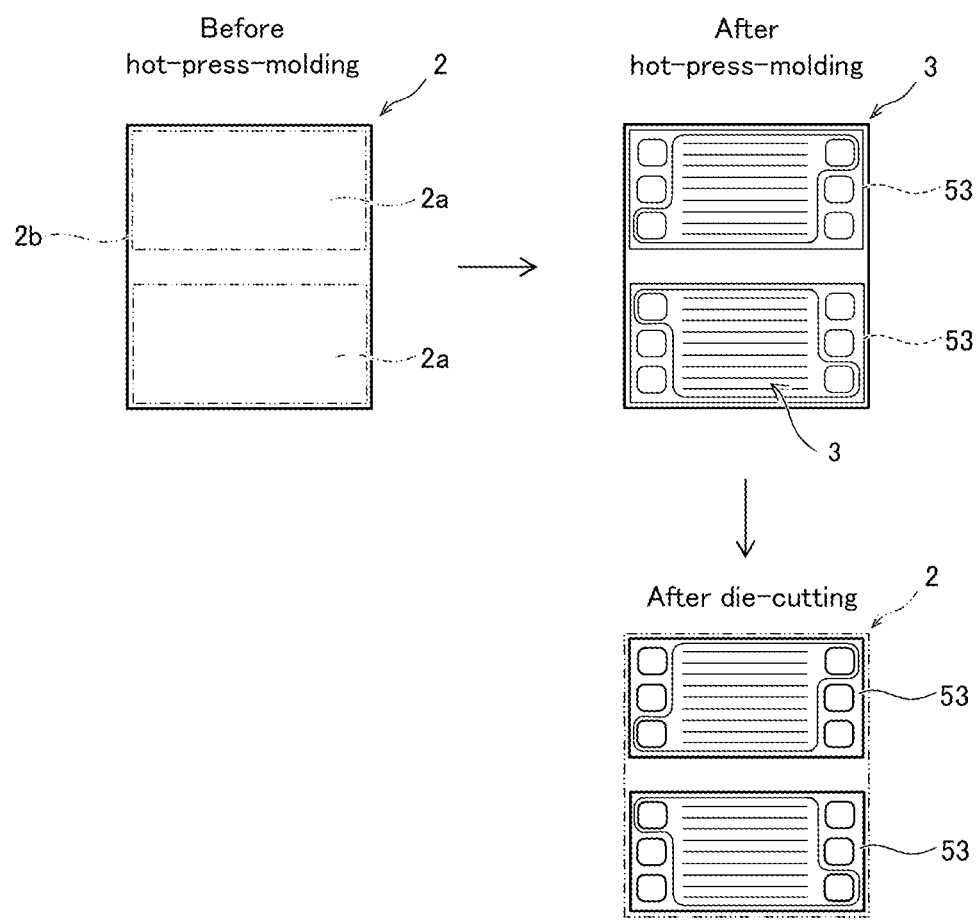
FIG. 9 shows plan views of the sheet material in each step, which is conveyed by the conveying device shown in FIG. 8.

The effects of the machining apparatus 1 of the present embodiment configured as described above will be described with reference to FIG. 3, FIG. 4, FIG. 8, and FIG. 9. FIG. 8 is a plan view showing the operation of the conveying device that conveys the setting jig on which a sheet material is set, along with the steps of the separator machining method using the machining apparatus. FIG. 9 shows the sheet material 2 prior to the hot-press-molding, the molded body 3 after the hot-press-molding, and the separator 53 after the die-cut machining.

In FIG. 7 and FIG. 8, when the sheet material 2 is hot-press-molded to form the separators 53, 53 for a fuel cell, the sheet material 2 is set up on the setting jig 5 such that the periphery 2b of the molding regions 2a is restrained (step of mounting the sheet material).

Specifically, as shown in FIG. 7, the sheet material 2 fits into the recessed groove 6e of the lower frame body 6, the protrusion 7e of the upper frame body 7 engages the recessed groove 6e of the lower frame body 6 via the sheet material 2, and the lower frame body 6 and the upper frame body 7 are securely coupled with the bolts 8. In this manner, as shown in FIG. 5, the sheet material 2 is restrained by the recessed groove 6e and the protrusion 7e while maintaining a flat state.

Specifically, as shown in FIG. 8 and FIG. 9, the molding regions 2a of the sheet material 2 are exposed from the openings 5a of the setting jig 5, with the periphery 2b surrounding the molding regions 2a restrained by the restraining portion 5b. In the present embodiment, the machining apparatus 1 includes the conveying device 40, and the setting jig 5 on which the sheet material 2 is mounted is supported by carriers 42, 42 movably attached to two rails 41, 41 of the conveying device 40.

In the present embodiment, the setting jig 5 is conveyed by the carriers 42, 42 of the conveying device 40, and is disposed on the support member 31 between the lower die 15 and the upper die 25 of the apparatus body 1A (step of disposing the setting jig). Specifically, as shown in FIG. 6, the guide shafts 17, 17 secured to the apparatus body 1A are inserted through the through holes 17a, 17a of the setting jig 5.

When the setting jig 5 is positioned in such a manner, the molding regions 2a of the sheet material 2 can be more accurately molded by means of the lower die 15 and the upper die 25 at the time of hot-press-molding. Even if the setting jig 5 moves downward, the mechanical interference with the corner guides 16, 16 can prevent it from becoming unmovable.

After the setting jig 5 is disposed between the lower die 15 and the upper die 25, the carriers 42, 42 retract and release the setting jig 5, so that the setting jig 5 becomes unrestrained. That is, in the present embodiment, since the support member 31 is urged upward by the first urging member 32, the sheet material 2 retained by the setting jig 5 is supported while keeping the clearance d1 between the sheet material 2 and the lower die 15 (see FIG. 3).

Next, the upper die 25 is lowered toward the lower die 15 so as to sandwich the molding regions 2a therebetween and the sheet material 2 is hot-press-molded to form the molded body 3 (see FIG. 4). The temperature adjusting boards 13 and 23 set the temperatures of the lower die 15 and the upper die 25 to predetermined temperatures, respectively. In the present embodiment, when the upper die 25 is lowered, the pressing-down member 33 abuts the upper frame body 7 of the setting jig 5 and the second urging member 34 is compressed so that the pressing-down member 33 retracts upward.

Meanwhile, while the upper die 25 is being lowered, the molding pattern 25a of the upper die 25 contacts the upper surface of the sheet material 2, and the setting jig 5 together with the sheet material 2 are lowered so that the lower surface of the sheet material 2 contacts the molding pattern 15a of the lower die 15. By lowering them further, the sheet material 2 is hot-press-molded to form the molded body 3 (step of hot-press-molding). In this manner, as shown in the drawing on the upper right of FIG. 9, the molded body 3 having two separators 53, 53 can be formed by performing hot-press-molding of one sheet material 2.

When the upper die 25 is lifted after a predetermined period of molding time, the support member 31 presses up the setting jig 5 with the urging force (elastic force) by the first urging member 32, and molding pattern 15a of the lower die 15 and the molded body 3 are instantaneously separated from each other. Meanwhile, while the upper die 25 is being lifted, the pressing-down member 33 presses down the setting jig 5 with the urging force (elastic force) by the second urging member 34, so that the molding pattern 25a of the upper die 25 and the molded body 3 are also instantaneously separated from each other (step of disengagement).

In this manner, when the sheet material 2 is hot-press-molded to form the molded body 3 in a shape in which a plurality of separators 53, 53 is arranged on a plane, the molded body 3 can be prevented from being excessively heated. Therefore, when the sheet material 2 contains a thermosetting resin, for example, thermal curing can be uniformly performed so that the molded body 3 with a uniformly cured molding pattern can be obtained. Meanwhile, when the sheet material 2 contains a thermoplastic resin, since the heat is quickly released after it is softened at the time of hot-press-molding, the shape of the molded body 3 can remain stable.

When the sheet material 2 is separated from the lower die 15, residues or the like could be produced at the time of hot-press-molding in some cases. However, it may be possible to drop the produced residues into the clearance d2 extending through the entire circumference between the lower die 15 and the support member 31. Further, with the clearance d2 secured to a certain extent, even if the sheet material 2 partially flows into the clearance d2 at the time of hot-press-molding, the sheet material 2 can be prevented from engaging with the support member 31 and the lower die 15.

Figure 10:
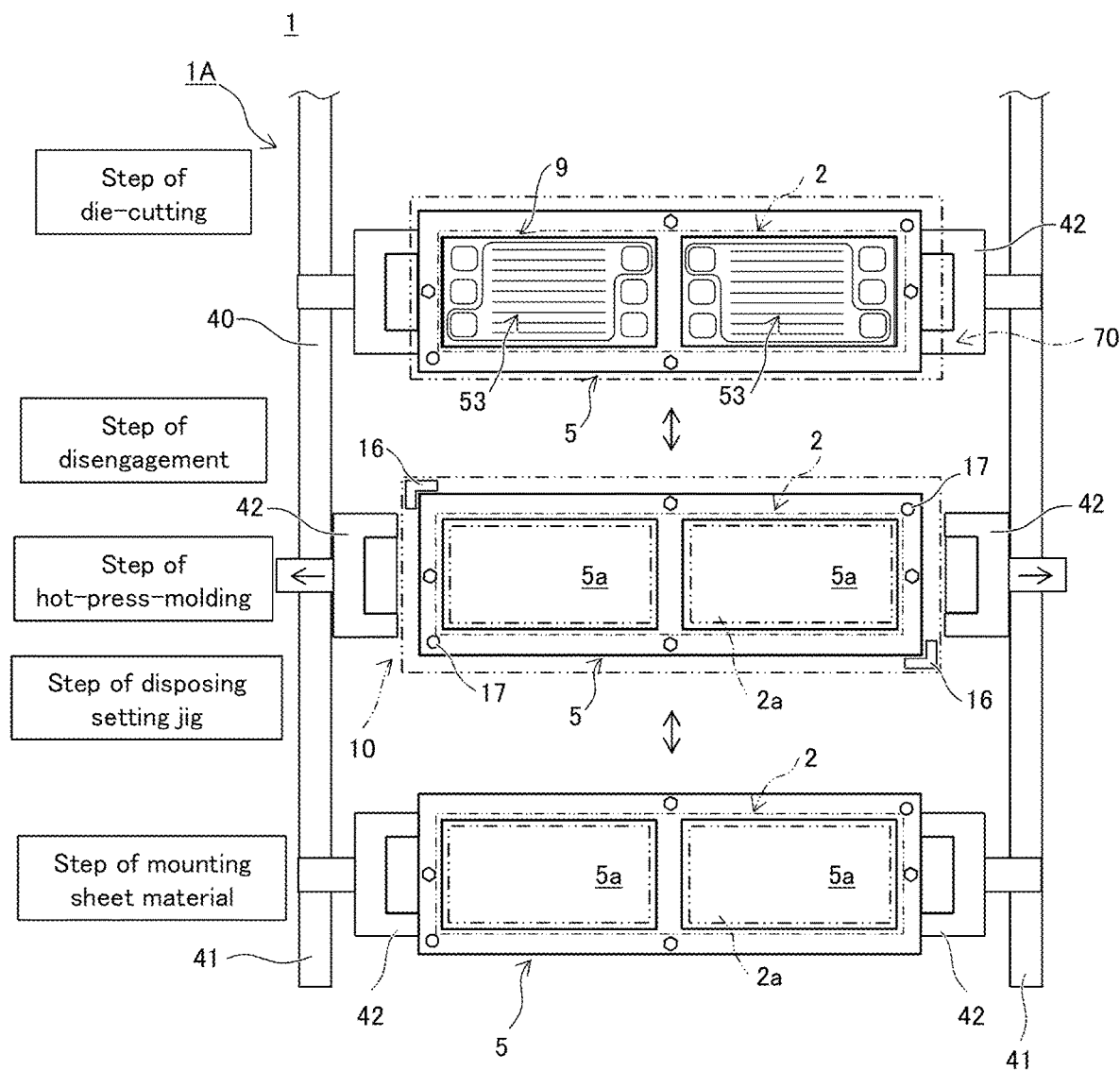
FIG. 10 is a plan view showing the operation of the conveying device that conveys the setting jig on which a sheet material is set, along with the steps of the separator machining method using the machining apparatus of a modification.

After the upper die 25 is disengaged from the lower die 15, the setting jig 5 is conveyed to the die-cut device 70 by means of the carriers 42, 42, while being retained by the carriers 42, 42 (see FIG. 10). At this position, as shown in the drawing on the lower right of FIG. 9, the two separators 53, 53 are die-cut from one molded body 3 (step of die-cutting).

It should be noted that in the present embodiment, the setting jig 5 is provided with the openings 5a so as to form the molded body 3 in a shape in which a plurality of rectangular separators 53 is arranged on a plane along the lateral direction of the separators 53. However, as shown in FIG. 10, the setting jig 5 may be provided with the openings 5a so as to form the molded body 3 in a shape in which a plurality of rectangular separators 53 is arranged on a plane along the longitudinal direction of the separators 53. This allows the length in the conveying direction of the conveying device 40 to shorten.

The embodiments of the present disclosure have been described in detail, but the present disclosure is not limited thereto and various design changes are possible without departing from the spirit of the present disclosure described in the claims. For example, the setting jig described herein as an example retains two separators, but may retain three or more separators.

What is claimed is:

1. A separator machining apparatus for hot-press-molding of a sheet material containing a conductive material and a resin material to form a shape of a separator for a fuel cell, the separator machining apparatus including:
   an apparatus body adapted to perform hot-press-molding of the sheet material to form a molded body in a shape in which a plurality of separators is arranged on a plane; and
   a setting jig adapted to set the sheet material on the apparatus body,
   wherein:
   the apparatus body includes:
      an upper die and a lower die adapted to sandwich the sheet material therebetween to perform hot-press-molding to form the molded body;
      a support member adapted to support the setting jig at a position where a molding region of the sheet material is disposed between the upper die and the lower die; and
      a first elastic spring adapted to urge the support member toward the upper die so as to separate the molded body from the lower die, with the upper die disengaged from the lower die, and
   the setting jig is in a frame shape having an opening for exposing the molding region of the sheet material to be molded by the apparatus body and a restraining portion for restraining a periphery of the molding region; and
   the apparatus body further includes:
   a second elastic spring member adapted to urge the setting jig toward the lower die so as to separate the molded body from the upper die until the upper die and the lower die sandwiching the sheet material are disengaged from each other;
   the setting jig includes a plurality of openings for molding regions of the plurality of separators;
   the setting jig includes a lower frame body and an upper frame body;
   a first partitioning portion is provided inside of a first outer frame portion of the lower frame body in a midsection of the lower frame body, such that a plurality of first openings corresponding in size to the molding regions of the plurality of separators are formed;
   a second partitioning portion is provided inside of a second outer frame portion of the upper frame body in a midsection of the upper frame body, such that a plurality of second openings corresponding in size to the molding regions of the plurality of separators are formed;
   the lower frame body and the upper frame body are integrally formed so that the first openings and the second openings overlap each other, such that the plurality of openings of the setting jig is formed in the setting jig; and
   the restraining portion is formed by the first and second outer frame portions that sandwich a portion of a periphery of each of the molding regions of the plurality of separators, and the first and second partitioning portions.

2. The separator machining apparatus according to claim 1, wherein one of the first outer frame portion or the second outer frame portion has a recessed groove and the other one of the first outer frame portion or the second outer frame portion has a protrusion to engage the recessed groove.

3. The separator machining apparatus according to claim 1, wherein:
   the support member is a frame member having a rectangular outer shape;

the apparatus body includes a subset plate to which the lower die is secured;

on the subset plate, two guide shafts are arranged vertically that are inserted into through holes formed at diagonally-positioned two corners of four corners of the support member and through holes formed at diagonally-positioned two corners of four corners of the setting jig; and two corner guides are arranged vertically to guide diagonally-positioned corners different from the diagonally-positioned corners of the support member.

4. The separator machining apparatus according to claim 1, wherein: the apparatus body including a subset plate to which the lower die is secured; and a temperature adjusting board including a built-in electric heater is disposed below the subset plate.

5. A separator machining method using the separator machining apparatus according to claim 1, the separator machining method including at least:

mounting the sheet material on the setting jig so as to restrain the periphery of the molding region of the sheet material;

disposing the setting jig on the support member;

performing hot-press-molding of the sheet material to form the molded body such that the upper die is lowered toward the lower die to sandwich the molding region of the sheet material between the upper die and the lower die; and disengaging the upper die from the lower die.

* * * * *